United States Patent [19]
Rielly et al.

[11] Patent Number: 5,831,848
[45] Date of Patent: Nov. 3, 1998

[54] DISTRIBUTED ENVIRONMENTAL PROCESS CONTROL SYSTEM

[75] Inventors: David A. Rielly, Upton, Mass.; Eric M. Desrochers, Nashua; Joseph W. Fortier, Dover, both of N.H.; Maurice R. Vincent, Bradford; Robert Labrecque, Lynn, both of Mass.

[73] Assignee: Phoenix Controls Corporation, Newton, Mass.

[21] Appl. No.: 559,822

[22] Filed: Nov. 17, 1995

[51] Int. Cl.⁶ .................................................. G05B 15/02
[52] U.S. Cl. ...................... 364/132; 364/140.03; 370/402
[58] Field of Search ................... 364/131, 132, 364/135–140, 550, 557, 140.01–140.05; 395/200.1, 200.19, 200.05, 553, 559, 651, 200.3, 200.55, 200.78, 200.68, 200.73, 200.38; 370/401, 402, 502, 458, 443, 459; 454/61, 238, 59, 56, 234; 236/49.3, 49.4, 51

[56] References Cited

U.S. PATENT DOCUMENTS

| | | | |
|---|---|---|---|
| 4,528,898 | 7/1985 | Sharp et al. | 98/115.3 |
| 4,706,553 | 11/1987 | Sharp et al. | 98/115.3 |
| 4,742,475 | 5/1988 | Kaiser et al. | 364/550 |
| 4,780,814 | 10/1988 | Hayek | 364/200 |
| 4,887,266 | 12/1989 | Neve et al. | 370/349 |
| 5,086,505 | 2/1992 | Goldberg et al. | 395/651 |
| 5,439,414 | 8/1995 | Jacob | 454/61 |
| 5,562,537 | 10/1996 | Zuer et al. | 454/61 |

FOREIGN PATENT DOCUMENTS

| | | | |
|---|---|---|---|
| 0 196 677 A2 | 10/1986 | European Pat. Off. | D03D 51/00 |
| 0 562 333 A2 | 9/1993 | European Pat. Off. | G05B 19/417 |
| 0 622 712 A2 | 11/1994 | European Pat. Off. | G05B 19/05 |
| 2 283 836 | 5/1995 | United Kingdom | G06F 19/00 |
| 2 283 887 | 5/1995 | United Kingdom | H04L 12/403 |

*Primary Examiner*—Reba I. Elmore
*Assistant Examiner*—Steven R. Garland
*Attorney, Agent, or Firm*—Wolf, Greenfield & Sacks, P.C.

[57] ABSTRACT

A process control system includes a high speed serial backbone communications network, interconnecting a plurality of microprocessor based nodes that each act as the master to a high speed serial branch network comprising device controllers, such as air flow valve controllers and transducers. The primary network may operate in a time division multiplex mode whereby a node acting as a synchronizing station periodically issues a synchronizing signal that commands each node to execute a branch network control sequence, during which each node gathers and operates upon data it collects from the device controllers within its branch network, and issues commands based thereon to the branch network. An ensuing communications sequence also triggered by the synchronizing signal enables each node on the primary network to transmit a command or a response to any other node and, through such other node, to any device controller in any branch network of the system. Serial ports on each node permit user access from any node on the primary network to any other point on the system for purposes of monitoring and control. Serial ports on each device controller permit user access to local device parameters.

30 Claims, 4 Drawing Sheets

DISTRIBUTED ENVIRONMENTAL PROCESS CONTROL SYSTEM

FIELD OF THE INVENTION

This invention relates in general to process control systems. More particularly this invention relates to a microprocessor based distributed control system for indoor environmental control, such as laboratory ventilation control. In laboratory ventilation control applications, the invention relates to systems wherein control and monitoring of the heating, cooling and ventilation control devices of a plurality of individual laboratory rooms, including the control of make up air supply requirements in response to the variable exhaust requirements of devices such as fume hood exhaust valves, may be interconnected and integrated in a system of high speed communication networks, thereby enabling the real time monitoring and control of all of the devices included in the system from any point in the system. The invention is more generally applicable in providing means for the highly flexible programming, control and monitoring of process systems by controlling the pumps, boilers, chillers, heaters, agitators, mixers and the like that carry out the process.

BACKGROUND OF THE INVENTION

In recent years the control of ventilation in laboratories containing fume hoods for the containment of toxic fumes has increased greatly in sophistication, notably with the development of electronically controlled variable volume fume hoods, in which the volume of air exhausted by the fume hood is precisely and nearly instantaneously controlled as a function of the extent of opening of the fume hood sash, the use to which the fume hood is being applied, and other factors. Examples of such fume hood controls are described in U.S. Pat. Nos. 4,706,553 and 4,528,898 assigned to the assignee of the present invention.

The use of variable volume fume hoods in a laboratory space generally requires their integration in a room ventilation control system that includes provision for the supply of make up air, the temperature conditioning of the supply air and the provision of a room exhaust device to exhaust differences between the volume of air being supplied to the laboratory space and the volume being exhausted through the fume hoods, including any user defined positive or negative offset. For this purpose electronic controllers have been developed having the capability, based on inputs from various devices such as air flow valves, air flow sensors, thermostats and the like, to comply with user defined minimum or maximum conditions for air flow and temperature, and to balance the supply and exhaust flows by controlling either a make up air supply device or a general exhaust device or both.

The very substantial expense and the stringent safety considerations involved in the operation of ventilation systems for laboratory installations having large numbers of fume hoods, typically distributed among many rooms, renders highly desirable the development of means for the centralized monitoring and control of such laboratory space ventilation systems.

However the critical importance of safety considerations in the operation of laboratory fume hood equipment imposes demanding constraints on any centralized monitoring and control system, in that it is imperative to maintain at all times the ability of numerous air flow control devices to respond nearly instantaneously, that is, on the order of fractions of a second, to changing air flow conditions in a fume hood or laboratory room. As a consequence a distributed control system like that of the present invention, that is able to satisfy the stringent process control conditions existing in the laboratory ventilation control environment, is also well suited to other and less stringent process control applications.

Furthermore, it is highly desirable to provide software maintenance access to remote elements of the system without requiring physical access to the device to be maintained.

Accordingly, improved monitoring and control for laboratory ventilation systems is desired. It is further desired that the system be networked in such a manner that the control and monitoring of ventilation devices in any of a plurality of laboratory rooms may be performed from remote locations. It is further desirable to provide a networked process control and monitoring system whereby real time transmission of rapidly variable operational data generated by a plurality of control devices located in a plurality of physically separated rooms or spaces is effected efficiently and reliably.

Advantages of the invention will become apparent upon reading the following detailed description, while referring to the attached drawings, in which:

DETAILED DESCRIPTION

Figure 1:
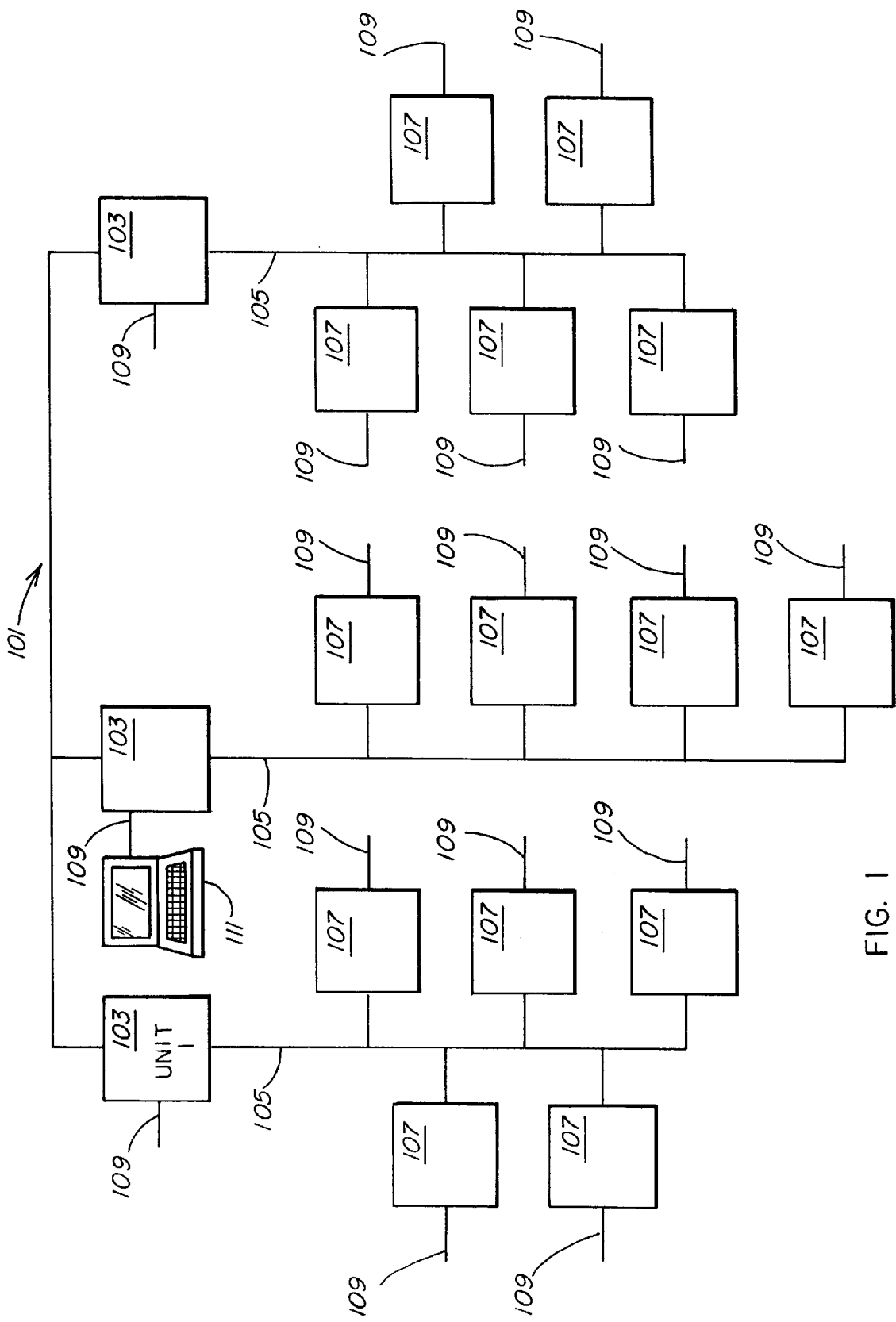
FIG. 1 is a block diagram of the network topology of an embodiment of the present invention.

As shown in FIG. 1, the process control system in accordance with the present invention includes a backbone or primary network 101 of nodes 103 and a plurality of branch networks 105 each controlled by a node 103 on the primary network 101. The primary network 101 may form a building-wide communications system, while each branch network 105 serves a sub-system such as a room, small area or laboratory. The system of networks of the invention interconnects, on a peer-to-peer basis, primary network nodes 103 comprised of microprocessor-based branch controllers, each of which controls, in a master-slave relationship over the branch network, a plurality of device controllers 107, such as air flow valve controllers.

The primary network 101 and the branch networks 105 are each serial multi-drop digital communication systems running at 375 Kbaud. The primary network is a peer-to-peer, time division multiplexed synchronous data link control (SDLC) communications platform for interconnecting up to 100 branch controllers 103. In turn each branch controller 103 may be connected via its branch network 105 to as many as 31 device controllers 107. The branch networks 105 use both time division multiplexing and individual addressing of device controllers 107 to collect and transfer data. Unlike the primary network 101, the branch network 105 operates as a master-slave communications network with the branch controller 103 as the master. Each branch controller 103 and device controller 107 preferably includes a serial port 109 such as a EIA-232 port which allows the user to access any point on the system, and serves as a general purpose serial input/output gateway. For example a personal computer 111 may be attached as a terminal device.

Primary Network

The Primary network 101 interconnects a plurality of microprocessor based branch controllers 103 in a peer-to-peer relationship whereby each branch controller 103 may issue commands to and receive responses from any other branch controller 103 on the primary network 101, and through such other branch controller, to any device controller 107 in the system.

In the illustrated embodiment each of the branch controllers 103 on the primary network 101 incorporates a serial communications controller chip (FIG. 4, 408), such as the Zilog 85230 Enhanced Serial Communication Controller (ESCC), and communicates in a time division multiplexing (TDM) format. The primary network 101 illustrated is an SDLC network. The SDLC protocol is well-known, and used for its simplicity. However, other more complex protocols may be used in suitable applications as would be understood by those skilled in the art.

Figure 2:
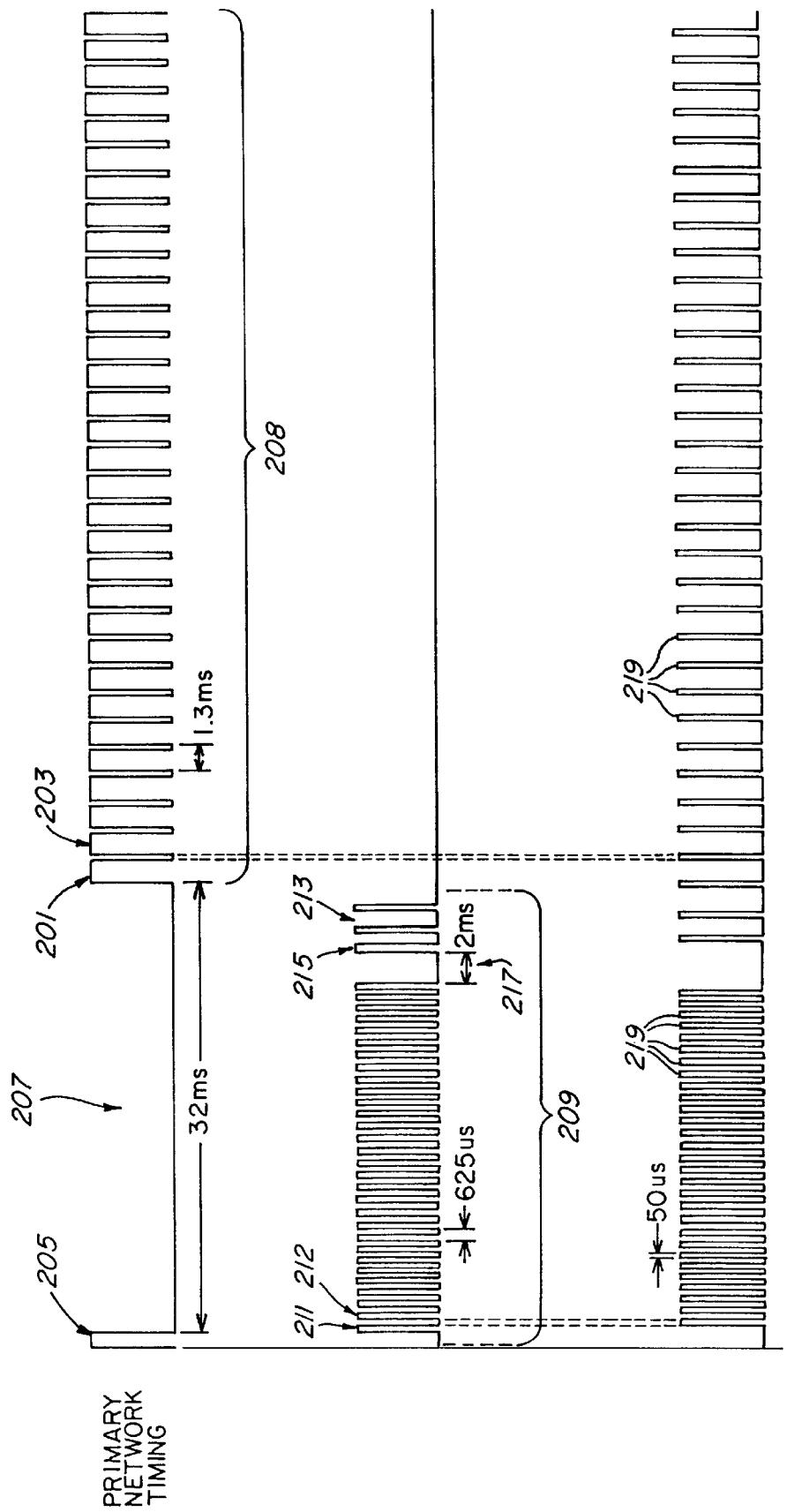
FIG. 2 is a timing diagram of the network communications of the embodiment of the present invention.
Figure 4:
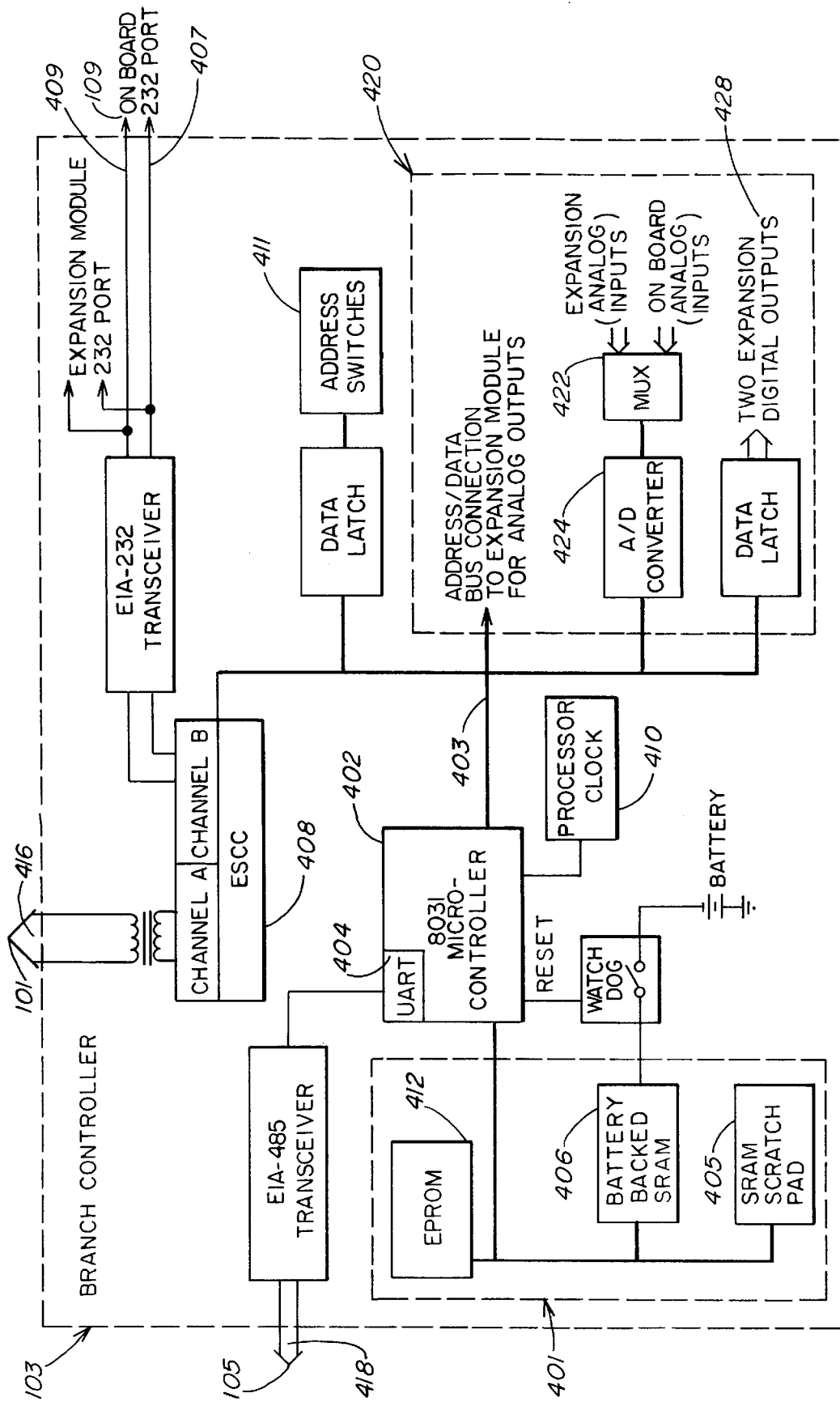
FIG. 4 is a block diagram of a branch controller.

Each branch controller 103 forming a node on the primary network 101 is assigned a unique address, for example via a set of DIP switches (FIG. 4, 411). This address is used to determine a communication time slot (e.g., FIG. 2, 201 and 203), in relation to a synchronization signal 205 issued on the primary network 101 by one of the branch controllers 103, the synchronizing station branch controller. Each branch controller 103 may only communicate on the primary network 101 in its assigned time slot 201, 203, etc. In addition to the provision of time slots for communications between branch controllers 103, each synchronization period 205 includes a preset time 207 for each branch controller 103 to conduct a branch network control cycle 209 including communication with the device controllers 107 on its branch network 105, as further described below.

Primary Network Time Slot Calculation

On boot up each branch controller 103 on the primary network 101 reads its primary network address and calculates its time slot location (201, 203, et seq.). For each branch controller 103 the appropriate time slot is determined by multiplying a time slot multiple, equal in the illustrated embodiment to 1350 $\mu$S, by the branch controller address minus 1, and adding to this result the gap time between time slots and the time slot 209 allocated for the branch network control cycle 209 (32 mS in the example embodiment). Each branch controller 103 on the primary network 101 accordingly carries out the following calculation:

Time from synch=(time slot multiple)×(address−1)+gap time+
(control cycle time slot)

In a large system for which the user chooses the option to enter a second branch network control cycle 209 per primary network synchronization cycle, branch controller addresses after 50 would be required to add an additional 32 mS in calculating the time location of their communication slot.

Primary Network Synchronization

The branch controller 103 with the lowest primary network address is arbitrarily designated as the synchronizing station, and it issues a synchronization signal 205 at predefined intervals based on the system size, which determines the synchronization interval. The illustrated embodiment enables three system sizes, large, medium and small, and the appropriate system size is set for example by DIP switches in each branch controller 103 in the system. In the illustrated embodiment the primary network 101 of a large system is resynchronized every 100 time slots, a medium system every 64 time slots, and the small system every 32 time slots.

The synchronization signal 205 is issued by the synchronizing station branch controller for example every 75.2, 118.2 or 199 mS depending on the user selection of a small, medium or large system. In the small and medium systems the control cycles 209 of all of the branch networks 105 are collectively initiated once per synchronization cycle. In the large system configuration, the time slots having addresses may optionally be adjusted to include an additional 32 mS interruption, for example between branch controller communication time slots 50 and 51, in order to insert a second branch network control cycle 209 in the interruption. This option serves to maintain a maximum limit of 100 mS between branch network control cycles.

Communications protocols like synchronous time division multiplexing, in which communications sequences depend on the cyclic issuance of a synchronizing signal, are prone to system failure upon failure for any reason of the device issuing the synchronization signal. The present invention includes means, in the event the synchronizing station branch controller 103 fails to issue a synchronization signal 205, or the synchronization signal 205 fails to reach a part of the primary network 101, for the branch controllers 103 not receiving a timely synchronization signal 205 then to execute in sequence an ascending time-out sequence, the outcome of which is to replace the synchronizing branch controller 103 with the branch controller 103 having the next lowest address in each intact segment of the primary network 101.

The time-out value is calculated based on network address, as follows. Each branch controller 103 has a timer which resets upon receipt by the branch controller of the primary network synchronizing signal 205. If the timer of any branch controller 103 expires before receipt of a valid synchronization signal 205, that branch controller proceeds to issue a synchronization signal 205 and thereafter to act as the synchronizing branch controller. However, the branch controller relinquishes this task on any subsequent receipt of a synchronization signal 205 from another branch controller 103 having a lower address on the primary network 101. Each branch controller 103 also pauses on the detection of an error during its own issuance of a synchronization signal 205, to check for receipt of a synchronization signal 205 from a branch controller 103 with a lower address on the primary network 101. This collision scheme permits reconnection of a broken cable and incremented powering up of branch networks 105 during which a lower address branch controller 103 may be brought on line subsequent to other branch controllers 103 having a higher address on the primary network 101.

Primary Network Communication

As noted above, the communication time slot 201, 203 etc. assigned and available on the primary network 101 to a branch controller 103 is fixed and based on the primary network address of the branch controller. In the embodiment illustrated for example in FIG. 1, branch controller Unit 1 may communicate on the primary network 101 only during a single time slot 201 per synchronization signal 205, beginning approximately 1600 uS after the completion of a 32 mS time slot 207 reserved for all branch controllers 103 to conduct their respective branch network control cycle 209. Effectively simultaneously for all branch controllers 103 on the primary network 101, the branch network control cycle 209 is initiated by a synchronization signal 211 from the synchronizing station branch controller 103. The simultaneous gathering of data 212 by each of the branch controllers 103 from the device controllers 107 on their respective branch networks 105 takes approximately 21 mS to be completed. Immediately thereafter each branch controller 103 has the opportunity, over a time slot 213 of approximately 5 mS duration, to further interrogate each device controller 107 on its branch network 105. This time slot 213 is sufficient for the branch controller 103 to address one transmission to each device controller 107 on its branch network 105 and subsequently to receive one transmission back from each device controller 107.

Thereafter, and for the time remaining until the next synchronizing signal 205 is issued over the primary network 101, the branch controllers 103 are each allotted, in sequence of increasing primary network address number, a time slot 201, 203 et seq. in which to communicate on the primary network 101, each of these time slots being separated by 1.35 mS.

Primary Network Time Slot Data

The time slots 201, 203, et seq. assigned to each of the branch controllers 103 for primary network 101 communications are sufficiently wide to accommodate two transmissions by each branch controller 103, each limited to 16 bytes in the illustrated embodiment. Each such transmission issued on the primary network 101 by a branch controller 103 to another branch controller 103 may be directed to a different address and may be a command or a response to a command. Typical examples of commands a branch controller 103 might issue to another branch controller 103 include a request for flow data by a branch controller 103 serving as a central data collection station or a response to a query by another branch controller 103.

To store commands, each branch controller 103 includes a memory (FIG. 4, 401), as discussed below. The memory 401 holds a primary network command table (FIG. 3, 301), which contains both "persistent commands", created by I/O requests from a suitable programming tool, not shown, and "temporary commands" generated by the branch controller 103 in response to requests received by the branch controller 103 over either the primary network 101 or the branch network 105, or at a serial port 109 of the branch controller 103, such as an EIA-232 port. Each branch controller 103 maintains temporary commands in its command table 301 until it has transmitted a response to the temporary command to the source controller originating the command. If there are more than two messages awaiting execution in the branch controller command table (FIG. 3, 301), the branch controller 103 issues them sequentially, in a conventional first in first out (FIFO) manner.

Each entry into the command table (FIG. 3, 301) of any branch controller 103 includes code representing message status 303, byte count 305, destination address 307, opcode (command) 309, and data 311. Upon the actual transmission of each entry in its command table 301, the branch controller 103 additionally appends a sequence number 313 to the transmission. This sequence number 313 accompanies the transmission to the target branch controller 103, or device controller 107, and is in turn appended to the response, as a result of which the sending branch controller 103 is able to locate, in its command table 301, the source of the command evoking this response. Once the response is checked at the command table 301 it may be routed to the serial port 109 of the branch controller 103 or to a device controller 107 as appropriate.

Branch Network

In the illustrated embodiment of the invention each branch network 105 interconnects a branch controller 103 with up to 31 device controllers 107, such as air flow device controllers, in a master slave mode in which the device controllers 107 communicate only in response to interrogation by the branch controller 103. In the laboratory room ventilation applications to which the illustrated embodiments are directed, the branch networks 105 enable the branch controllers 103 to execute flow summation and balancing calculations for air flow devices under their respective supervision, and also enable various data to be collected by the branch controllers 103 from the device controllers 107 in their respective branch networks 105, during the command/response time slot 213 of the branch network control cycle time slot 207 of the primary network 101.

Each branch controller 103 can be a relatively simple device, as shown in the block diagram of FIG. 4. The basic components of a branch controller 103 are a microprocessor 402 and its necessary supporting components. In the illustrated embodiment, these include an EPROM 412 holding executive software instructions, network operation software instructions and environmental control software instructions; a RAM 406 holding any free programs downloaded to the branch controller, data collected during network operations or environmental control operations; a serial communications controller 408; and a processor clock 410. The branch controller 103 may also have a RAM 405 for performing scratch pad calculations. The microprocessor 402 selected for the illustrated embodiment is an industry-standard Intel 8031 device, which includes a universal asynchronous receiver/transmitter (UART) 404, which can sustain the communication speeds required by the branch network 105. The preferred serial controller 408 is a Zilog 86230 Enhanced Serial Communications Controller (ESCC).

Branch controllers 103 communicate with other devices via one of three serial ports. An EIA-232 port 109 is provided for communication with terminal devices, gateways and other external hardware. The EIA-232 standard defines a well-known serial communications medium including separate transmit 407 and receive 409 lines. Two EIA-485 ports 416, 418 provide communication respectively with the primary network 101 and with the branch network 105. The EIA-485 standard defines a well-known serial communications medium including one balanced differential line, which may be used for bi-directional communication. One EIA-485 port 416 is controlled by the ESCC to communicate over the primary network 101. The second EIA-485 port 418 is controlled by the UART 404 built into the 8031 microprocessor to communicate over the branch network 105.

In some indoor environmental control applications, analog inputs and outputs or other input/output (I/O) configurations may be required. In order to provide such flexibility, the branch controller 103 may include an I/O port 420 for receiving a customized I/O module. One useful such module (not shown) includes five analog input channels serviced through a multiplexer 422 to an individual analog-to-digital converter 424, two analog output channels (not shown) controlled by the microprocessor 402 through a connection to the microprocessor address and data bus 403, and two digital output channels 428. Such an I/O module may, for example, be used to connect the branch controller 103 to older devices lacking digital controls or to digital devices not specifically designed for use in the described configuration.

To support the communication speed of the branch network 105, the UART 404 of the 8031 microprocessor 402 is configured to communicate at $\frac{1}{32}$ of the processor clock 410 speed. In the illustrated embodiment of the invention, the processor clock 410 of all of the branch controllers 103 and device controllers 107 runs at a frequency of 12 MHz, producing a communication speed of 375 Kbaud.

The branch network 105 is also based on time division multiplexing. The 8031 microprocessor 402 employed in the illustrated embodiment generates 11-bit frames, each of which contains start, stop, and utility bits and 8 bits of data. The 8031 UART 404 and the UART used on device controllers 107 may be set up to only receive data if the utility bit is set in a particular transmission, thereby enabling a device controller 107 to ignore transmissions from its branch controller 103 that are intended for other device controllers 107 on the same branch network 105.

The physical medium for all network connections in the illustrated embodiment is a shielded, twisted-pair type of communications cable. However, any convenient bi-directional medium capable of sustaining the required communications bandwidth may be used, including other types of cable, fiber optic infrared and other wireless connections.

The branch network control cycle 209 appropriate to each branch controller 103 is initiated each time the branch controllers 103 receive a synchronization signal 205 over the primary network 101 (except for the synchronizing station branch controller 103, which initiates its branch network control cycle 209 upon issuing its synchronizing signal 205). The branch controller 103 initiates its branch control cycle 209 by issuing a branch network synchronization command 211 to the device controllers 107 on its branch network 105. (In "large" systems, this command may optionally be issued again, for example between time slots of the primary network 101 having addresses 50 and 51.)

Similarly to the manner whereby the branch controllers 103 during the course of the primary network communications period 208 are each assigned a unique time slot (e.g. 201, 203 etc.) for communication on the primary network 101, each device controller 107 on a branch network 105 is assigned a unique time slot 212 within the branch network control cycle 209, determined by the address of the device controller 107 in the branch network 105, in which to communicate in response to the branch synchronization command 211.

Communications with external devices over EIA-232 ports 109 of the branch controllers 103 may take place during each gap 219 between time slots, except that no communications are permitted during time slot 217.

Branch Network Time Slot Calculation

The calculation of the branch network time slots 212 allocable to each device controller 107 on the branch network 105 follows the same general form as the calculation of the time slots 201, 203, et seq. assigned to the branch controllers 103 on the primary network 101. On boot up, each device controller 107 reads its address and calculates its time slot location. The time slot 212 of each branch network device controller 107 is determined by multiplying its address minus 1 by a time slot multiple, and adding a gap time, as in the following calculation:

Time from synch=((time slot multiple)×(address−1))+gap time

In the illustrated embodiment, each device controller time slot 212 has a duration of 600 $\mu S$.

Branch Network Control Cycle

In contrast to the ability of branch controllers 103 to transmit both commands and responses to commands in their assigned communications time slot 201, 203, et seq. on the primary network 101, device controllers 107 may in their respective communications time slots 212 on the branch network 105 only transmit responses to a set of application-specific commands defined by the user of the system. The response of each device controller 107 to the branch synchronization command 211 thus includes three items of data in the illustrated embodiment. In the laboratory ventilation system application of the illustrative embodiment, these three items of data are signals respectively representative of (a) exhaust setting, (b) supply setting, and (c) a user selected third parameter.

After the branch network time slots 212 for all 31 device controllers 107 on a branch network 105 have expired, the branch controller 103 uses the collected information to make any prescribed calculation and to issue commands 215 based thereon on the branch network 105. For example, in the illustrated embodiment each branch controller 103 calculates during time slot 217 the aggregate supply and exhaust for the laboratory room that it supervises, and a difference from prescribed conditions (including any user defined offsets or any user defined minimum or maximum flow or temperature limits). The branch controller 103 then calculates also during time slot 217 and issues 215 the setpoints necessary to properly balance the system in compliance with all user defined conditions and limits.

In a typical room ventilation application, it is a principal function of the control system to control the "make up air cycle" whereby the exhaust of conditioned air from the room, through venting devices such as laboratory fume hoods in addition to a controlled general exhaust valve or other device, is required to be balanced by an appropriate supply of "make up air", provided by a make up air supply valve. In the system of the present invention, control of the make up air cycle follows the time division multiplex sequence described above generally for the branch network control cycle 209, which allows for position/address independent connection to the branch controller 103 of the device controllers 107 respectively controlling the supply, exhaust and other controlled devices supervised by the branch controller 103 on its branch network 105.

In the course of each control cycle 209 of a branch network 105 controlling a laboratory room ventilation system, each device controller 107 or other branch network device responds in sequence, in its allocated time slot 212, by providing the branch controller 103 with supply, exhaust, status and flow feedback data. Upon receipt from each device controller 107 this information is immediately applied by the branch controller 103 to the calculation of the make up air equation, through the maintenance of a running tally summing the exhaust and supply information as it is received sequentially from the device controllers 107 on the branch network 105. When the time slot of the last-responding device controller 107 has expired, the branch controller 103 completes its calculation of the make up air equation, and then it issues on the branch network 105 a single command transmission, the make up air cycle response, that includes respectively the make up air flow set point, general exhaust flow set point, the total exhaust, supply air flow and other pertinent data. On receipt of this transmission from the branch controller 103, those device controllers 107 on its branch network 105 that are configured respectively as the make up air device controller, the general exhaust valve controller, or a bypass valve controller, recognize which portion or portions of the transmitted command data, if any, are pertinent to its operation, and proceed to execute any pertinent commands.

Branch Network Command/Response Activity

After the branch controller 103 has transmitted the make up air cycle response on the branch network 105, a set time slot 213 is allotted for the branch controller 103 to generate commands to individual device controllers 107 on its branch network 105 and to obtain a responsive transmission from each device controller 107, as addressed sequentially. This "command/response mode" may importantly be employed to deliver configuration commands to the device controllers 107. Commands may also be issued by the branch controller 103 in response to error conditions or alarms detected during the branch network control cycle 209, or requests made for point data (calculated or actual) contained at the device controller 107. This time slot 213 is also suitable for the issuance by the branch controller 103 of commands to initiate special sequences, such as, in laboratory ventilation applications, a purge-vent sequence.

Serial Port Gateways

As shown on FIG. 4, each branch controller 103 and each device controller 107 contains a serial port 109, such as an EIA-232 compliant port. The serial ports 109 of the branch controllers 103 allow the user to access via appropriate software from any branch controller 103 every other branch controller 103 and every device controller 107 on the system, and enable a highly flexible, balletic interaction among all of the controllers on the primary network 101 and the branch networks 105. A command issued at any serial port 109 is gathered and verified by that port's host branch controller 103 or device controller 107. Once the command's destination is determined, it is either issued locally over the branch network 105, or assigned a sequence number and placed in the primary network or branch network command tables (FIG. 3, 301) of the local branch controller 103.

Command/Response on Local branch network

If addressed to a device controller 107 or other device connected to the local branch network 105, the command travels through the branch network controller 103 to the desired destination, where it is acted upon, and, in due time, responded to. The response contains the sequence number and the opcode assigned to the command at origination. The branch controller 103 uses the sequence number and the opcode to route the message back to the serial port 109 that originated the command.

Command/Response Activity on Primary network and Points Beyond

A command entered through a serial port 109 and destined for a device or device controller 107 on a remote branch network 105 is routed in substantially the same way. At the branch controller 103 of the branch network 105 receiving the command (the local branch controller), it is gathered and verified as a valid command, its destination is determined, and the command is placed in the appropriate command table (FIG. 3, 301) of the local branch controller. For example, a command directed to a device controller 107 on a remote branch network 105 and connected to a different branch controller 103, requesting user status, is assigned a sequence number and the appropriate opcode by the local branch controller 103, and it is placed in the primary network "temporary command" table of the local branch controller. The command is thereafter transmitted to the remote target branch controller 103 during the primary network time slot 201, 203, etc. of the local branch controller 103.

Figure 3:
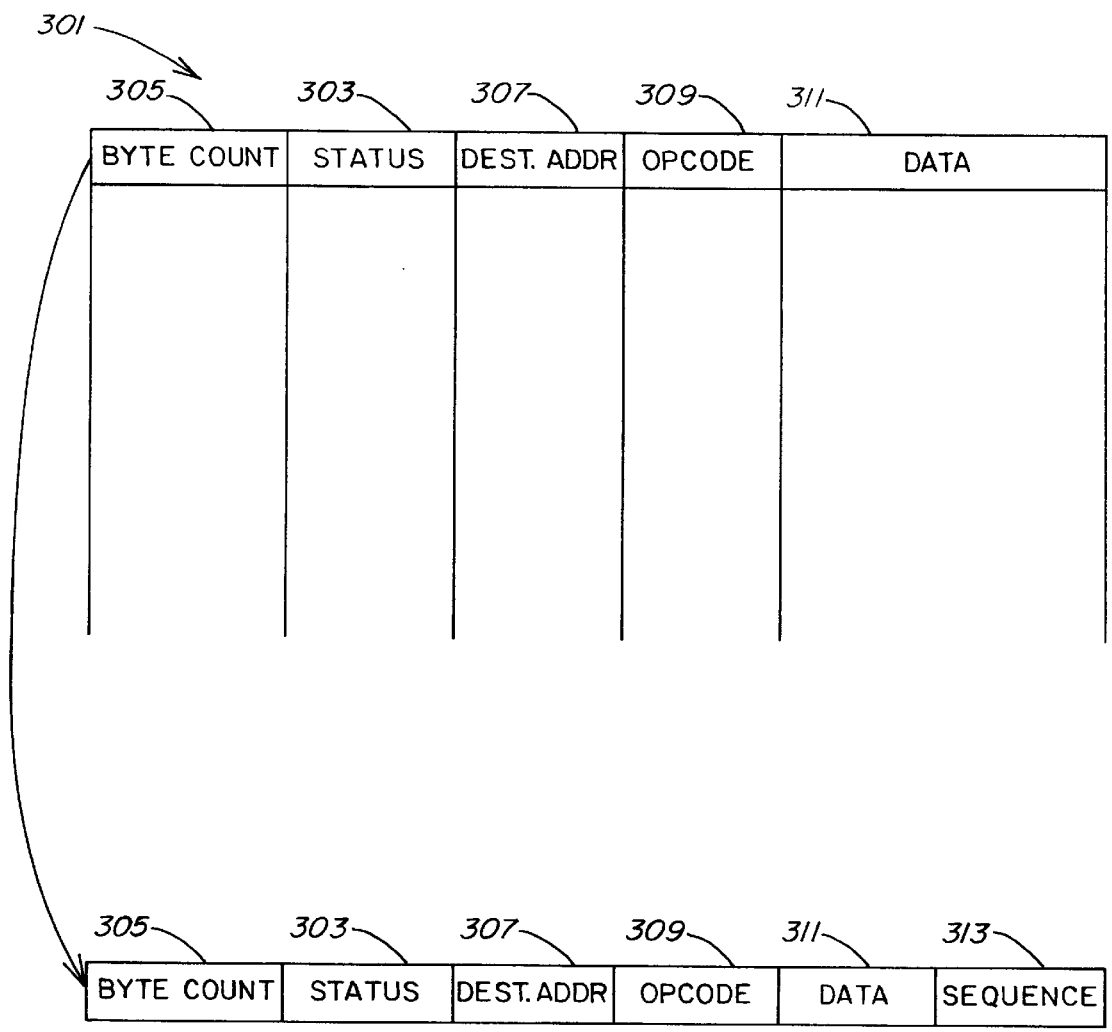
FIG. 3 is a schematic representation of a command table and command sent over the primary network.

On receipt of the command, the remote branch controller 103 gathers the command, verifies it, and places it (along with the command's sequence number and opcode) in its branch network command table (FIG. 3, 301). At the conclusion of the target branch controller's local control cycle 209, i.e., during the command/response time slot 213, the request is issued by the remote branch controller 103 to the target device controller 107. The target device controller 107 responds with the requested data, maintaining the sequence number and opcode. The remote branch controller 103 takes the response from its device controller 107 and places it in its command table (FIG. 3, 301). At the occurrence of the remote branch controller's primary network time slot 201, 203, etc. the response is passed back to the local branch controller 103.

The local branch controller 103 receives this response and, based on the sequence number and opcode, marks the original command in its command table (FIG. 3, 301) as received. Additionally, this opcode is used to determine the final destination of the response. In this case it is sent to the serial port command table. The message is then transmitted out the serial port 109 at the next available opportunity.

The present invention has been described and illustrated by means of a particular embodiment thereof. Numerous additions and modifications now obvious to those skilled in this art are contemplated as within the scope of this invention, which is limited only by the claims appended hereto.

What is claimed is:

1. A computer network for real-time control of an indoor environment, the computer network comprising:

a plurality of controller units each controller unit having a first network interface and a second network interface, one controller further having a serial port through which external commands are received; and a plurality of environmental control devices connected to the first network interface of a predetermined controller unit, the predetermined controller unit communicating through the first network interface with the plurality of environmental control devices using a first synchronous communications protocol;

wherein the second network interfaces of the plurality of controller units are connected to each other, the plurality of controller units communicating with each other through the second network interfaces using a second synchronous communications protocol in which one time slot is reserved for the communicating through the first network interface by the predetermined controller unit to which the plurality of environmental control devices are connected; and further wherein communicating through the second network interface is inhibited during the reserved time slot.

2. The computer network of claim 1, wherein the first synchronous communications protocol and the second synchronous communications protocol each are synchronous data link control protocols.

3. The computer network of claim 2, wherein the second synchronous communications protocol further includes a plurality of time slots corresponding to the plurality of controllers for exclusive use thereby.

4. The computer network of claim 2, wherein the first synchronous communications protocol further includes:

a plurality of time slots corresponding to the plurality of environmental control devices for exclusive use thereby;

a time period of no communication, during which the predetermined controller unit solves an environmental control equation; and a time period during which the controller broadcasts a solution of the environmental control equation over the first network interface.

5. The computer network of claim 1, wherein at least one of the first synchronous communications protocol and the second synchronous communications protocol operate over a shielded twisted-pair cable medium.

6. The computer network of claim 1, wherein the plurality of environmental control devices include air flow transducers, air supply devices and air exhaust devices, further comprising:

software executing in the predetermined controller unit to which the plurality of environmental control devices are connected, the software including instructions for measuring air flow using the air flow transducers and adjusting set points of the air supply devices and the air exhaust devices to achieve a desired air flow and pressure.

7. The computer network of claim 1, wherein the one controller and the predetermined controller unit are the same controller unit of the plurality of controller units.

8. A method of communicating in a computer network including a backbone network of nodes, each node also controlling a branch network, comprising the steps of:

multiplexing communications between nodes using a synchronous peer-to-peer communications protocol, reserving at least one time slot during which no communications occur between nodes;

during the reserved time slot, performing independent communications between each node and its branch network using a synchronous communications protocol.

9. The method of claim 8, wherein one node generates synchronization signals, the method further comprising the steps of:

the synchronization signals failing to reach a first node after a first predetermined time period; and the first node generating a replacement synchronization signal after the predetermined time period.

10. The method of claim 9, further comprising the steps of:

the synchronization signals and the replacement synchronization signal failing to reach a second node after a second predetermined time period longer than the first predetermined time period; and the second node generating a new replacement synchronization signal after the second predetermined time period.

11. The method of claim 8, wherein a plurality of devices reside on the branch network, and wherein a synchronization signal is generated by the nodes, and said synchronization signal generates a deterministic response by the devices residing on the branch network, simultaneously at each node.

12. The method of claim 11 wherein said response comprises the communication of at least three items of control information per device controller, and said node controlling a branch network maintains a summed tally of at least one such item of control information as each device controller responds.

13. The method of claim 12 wherein at the completion of all device controller responses the branch controller issues a single transmission comprising data algebraically compiled based on said tally of said items of control information, and said data from said single transmission is selectively receivable by less than all of the device controllers.

14. The method of claim 12, wherein the summed tally is a sum of air flow rates in a building environmental control system.

15. The method of claim 14, further comprising the step of:

said branch controller issuing a single transmission comprising air flow rate set point data computed from the summed tally.

16. The method of claim 15, further comprising the step of:

less than all of the device controllers receiving the data contained in the single transmission.

17. The method of claim 11 wherein communication of lesser defined information may also take place on the branch network prior to the commencement of communications between nodes.

18. The method of claim 8, further comprising the step of:

transmitting a message between a node and an environmental control device through the node's branch network.

19. The method of claim 18, wherein the step of transmitting further comprises the step of:

giving the environmental control device an operating set point.

20. The method of claim 19, further comprising the step of:

receiving from the environmental control device a measurement of operating conditions.

21. The method of claim 20, further comprising the step of:

computing a new value for the operating set point, the new value based on the measurement of operating conditions.

22. In a computer network for real-time control of environmental control devices, the computer network including a plurality of nodes, each node connected for communication through a backbone network using time division multiplexing;

a branch network, connected to a corresponding node; and a plurality of environmental controls connected to the branch network for communication with corresponding node;

the improvement comprising:

the time division multiplexing by which the plurality of nodes communicate includes at least one time slot during which no communications occur between nodes; and the plurality of environmental controls communicate through the branch network with the corresponding node during the at least one time slot.

23. The computer network of claim 22 wherein the backbone network includes a shielded twisted-pair cable medium.

24. The computer network of claim 22, wherein communication over the backbone network is performed using a synchronous peer-to-peer protocol.

25. The computer network of claim 22, wherein:

one of the nodes generates a synchronization signal and the synchronization signal triggers deterministic responses by the plurality of environmental controls.

26. The computer network of claim 25, wherein communication of lesser defined information may also take place on a branch network.

27. In a computer network for real-time control of environmental control devices, the computer network including a plurality of nodes, each node connected for communication through a backbone network using time division multiplexing;

a branch network, connected to a corresponding node; and a plurality of environmental controls connected to the branch network for communication with corresponding node;

the improvement comprising:

the time division multiplexing by which the plurality of nodes communicate includes at least one time slot during which no communications occur between nodes; and the plurality of environmental controls communicate through the branch network with the corresponding node during the at least one time slot, wherein communication over the backbone network is performed using a synchronous peer-to-peer protocol, further comprising a synchronizing node having an output carrying a synchronization signal, the output connected to the backbone network, a first one of the plurality of nodes having an output carrying a replacement synchronization signal when the synchronization signal fails to reach the first node within a predetermined period of time.

28. The computer network of claim 27, wherein:

a second one of the plurality of nodes having an output carrying a new replacement synchronization signal when the synchronization signal and the replacement synchronization signal both fail to reach the second node within a second predetermined period of time.

29. In a computer network for real-time control of environmental control devices, the computer network including a plurality of nodes, each node connected for communication through a backbone network using time division multiplexing;

a branch network, connected to a corresponding node; and a plurality of environmental controls connected to the branch network for communication with corresponding node;

the improvement comprising:

the time division multiplexing by which the plurality of nodes communicate includes at least one time slot during which no communications occur between nodes; and the plurality of environmental controls communicate through the branch network with the corresponding node during the at least one time slot, wherein:

one of the nodes generates a synchronization signal and the synchronization signal triggers deterministic responses by the plurality of environmental controls, wherein said deterministic responses include a plurality of control data for each environmental control and wherein the one of the nodes maintains a summed tally of at least one of the control data.

30. The computer network of claim 29, wherein the node generates a single transmission selectively receivable by less than all of the environmental controls, the transmission comprising data algebraically compiled based on the tally.

* * * * *